(12) United States Patent
Sugita

(10) Patent No.: US 6,545,999 B1
(45) Date of Patent: Apr. 8, 2003

(54) WIRELESS COMMUNICATING METHOD, WIRELESS COMMUNICATING SYSTEM, COMMUNICATING STATION, AND CONTROLLING STATION

(75) Inventor: Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/267,339

(22) Filed: Mar. 15, 1999

(30) Foreign Application Priority Data

Mar. 17, 1998 (JP) .......................................... 10-066790

(51) Int. Cl.[7] .............................................. H04B 7/212
(52) U.S. Cl. ...................................... 370/347; 370/337
(58) Field of Search ................................. 370/311, 310, 370/389; 455/574, 69, 343; 340/10.33, 10.34, 3.4, 3.41, 7.33, 3.9

(56) References Cited

U.S. PATENT DOCUMENTS

| | | | | |
|---|---|---|---|---|
| 5,241,542 A | * | 8/1993 | Natarajan et al. | 340/7.34 |
| 5,483,517 A | * | 1/1996 | Kurata et al. | 307/10.1 |
| 5,535,207 A | * | 7/1996 | Dupont | 340/7.34 |
| 5,581,556 A | * | 12/1996 | Ohie | 370/431 |
| 5,590,396 A | * | 12/1996 | Henry | 340/7.38 |
| 6,085,114 A | * | 7/2000 | Gibbons et al. | 455/343 |
| 6,151,352 A | * | 11/2000 | Taki et al. | 375/132 |

FOREIGN PATENT DOCUMENTS

| JP | 06132968 | 5/1994 | H04L/12/44 |
|---|---|---|---|

* cited by examiner

*Primary Examiner*—Wellington Chin
*Assistant Examiner*—William Schultz
(74) *Attorney, Agent, or Firm*—Jay H. Maioli

(57) ABSTRACT

A wireless communicating method for a system having a plurality of communicating stations and a controlling station for controlling an accessing operation of the communicating stations in which the controlling station is disposed between the communicating stations, a communication signal is transmitted and received between each of the communicating stations and the controlling station, as the communication signal has a control area and a data area structured as a frame on a time division basis. The method includes the steps of causing a communicating station to transmit a communicating station state change request signal to the control station, causing the control station to transmit a communicating station state signal to the communicating station so as to enter the relevant communicating station into a sleep state, and causing a communicating station in the sleep state to receive a start command signal that causes the relevant communicating station to cancel the sleep state.

19 Claims, 17 Drawing Sheets

| #1 | WN1 |
|---|---|
| #2 | WN2 |
| #3 | WN3 |
| #4 | WN4 |
| #5 | WN5 |
| #6 | WN6 |
| ⋮ | ⋮ |

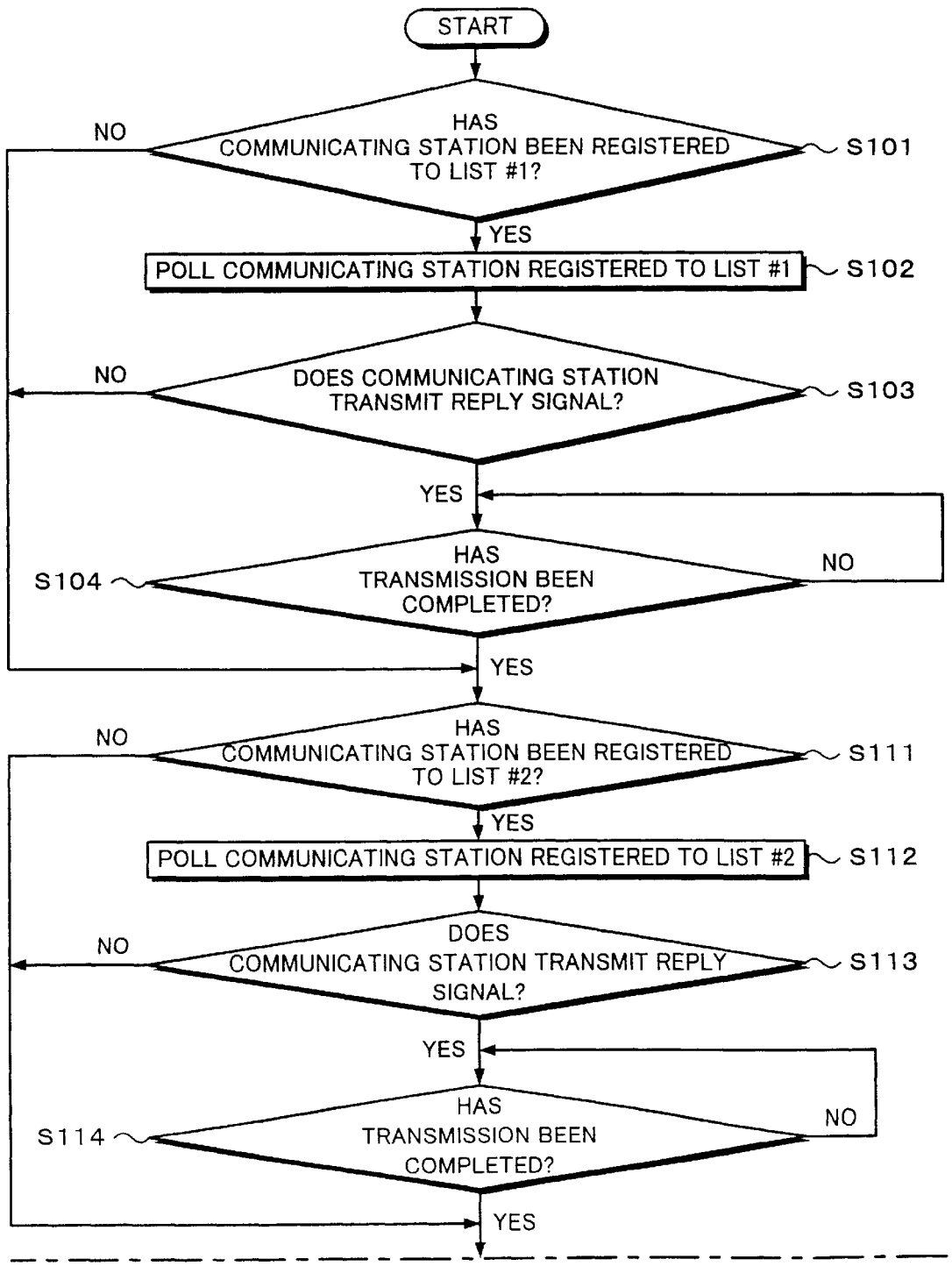

Fig. 7

| #1 | WN1 |
|---|---|
| #2 | WN2 |
| #3 |  |
| #4 | WN4 |
| #5 | WN5 |
| #6 | WN6 |
| ⋮ | ⋮ |

Fig. 8

| #1 | WN1 |
|---|---|
| #2 | WN2 |
| #3 | WN1 |
| #4 | WN3 |
| #5 | WN1 |
| #6 | WN4 |
| ⋮ | ⋮ |

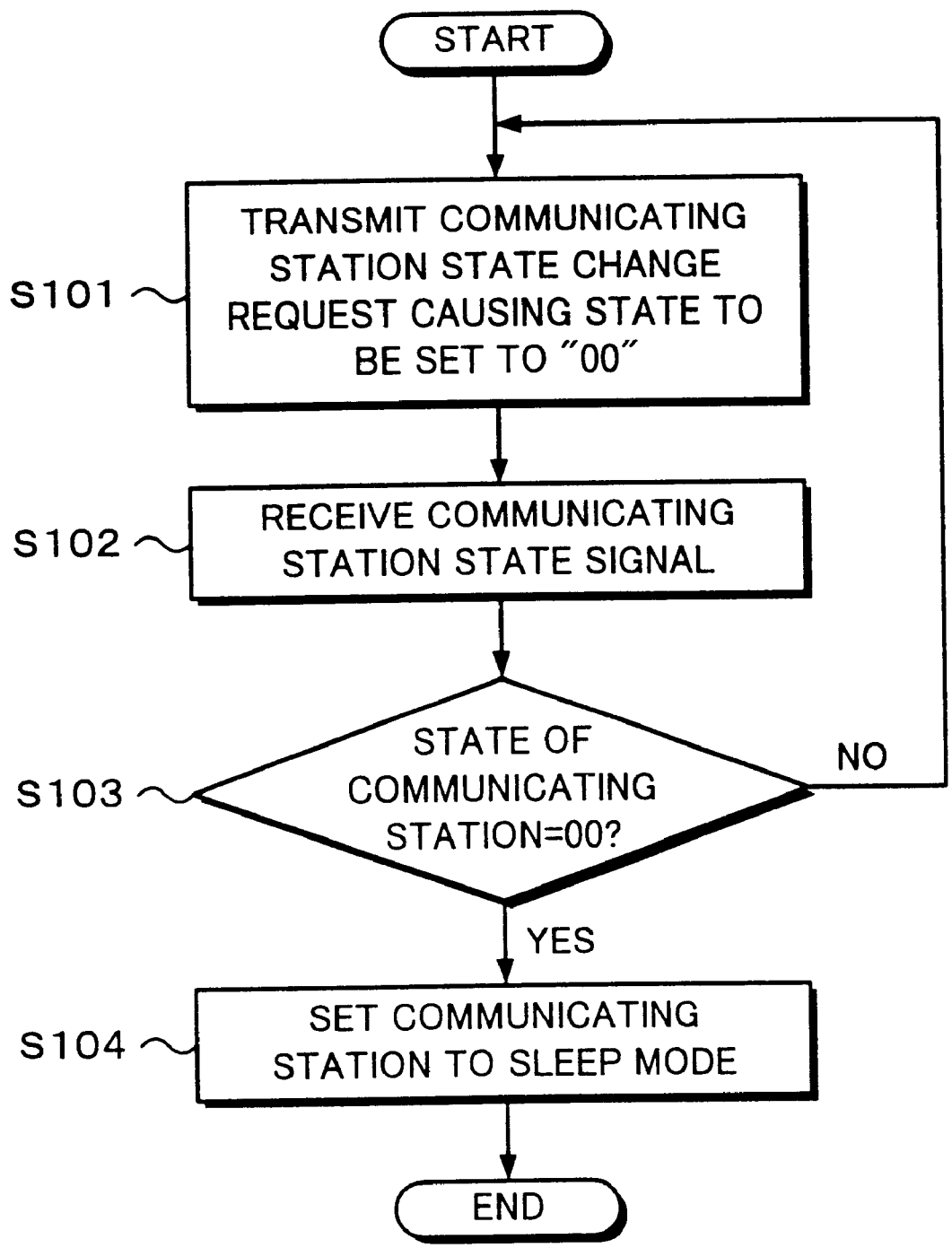

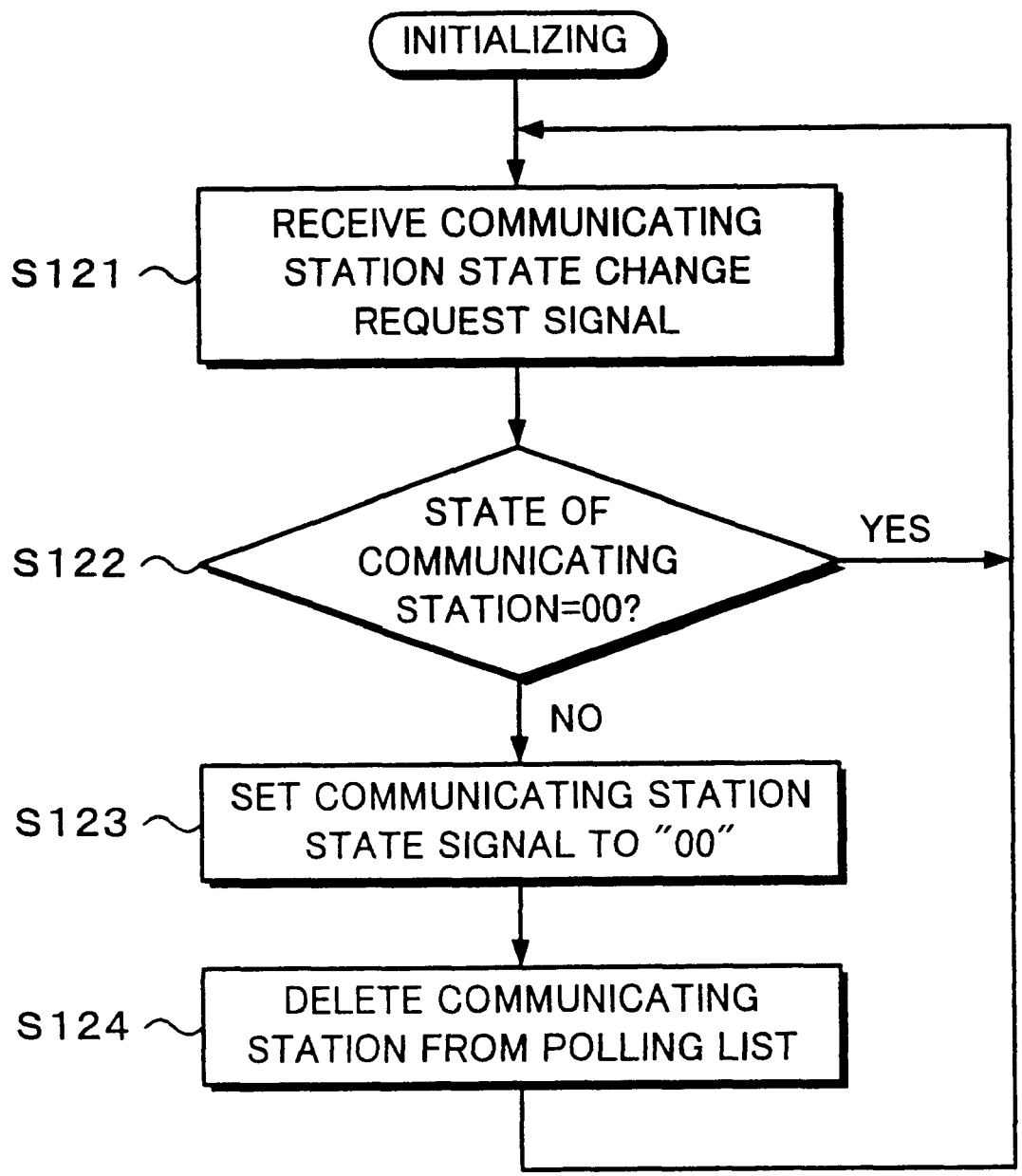

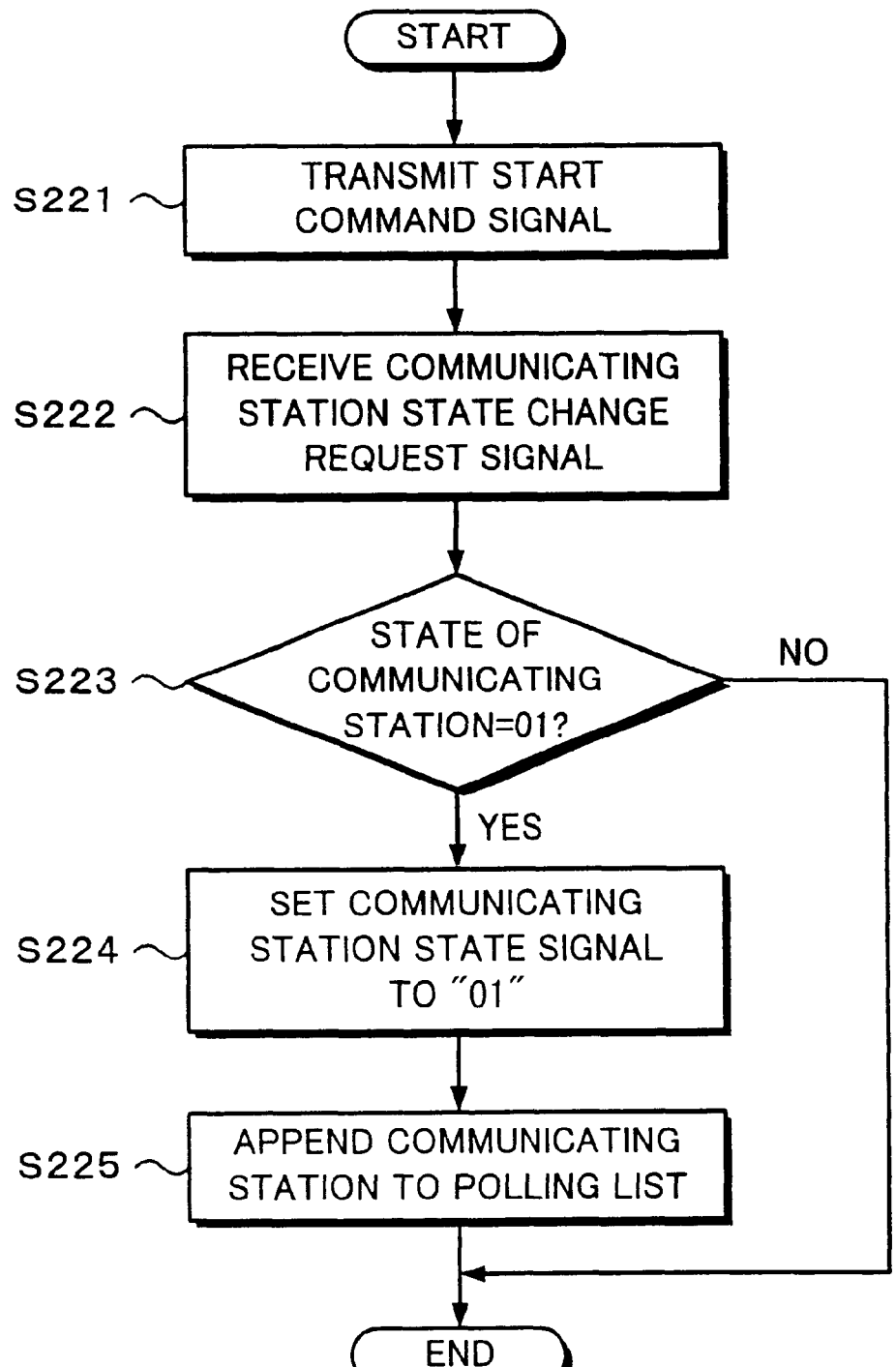

(COMMUNICATING STATION SIDE)

(CONTROLLING STATION SIDE)

(COMMUNICATING STATION (A) SIDE)

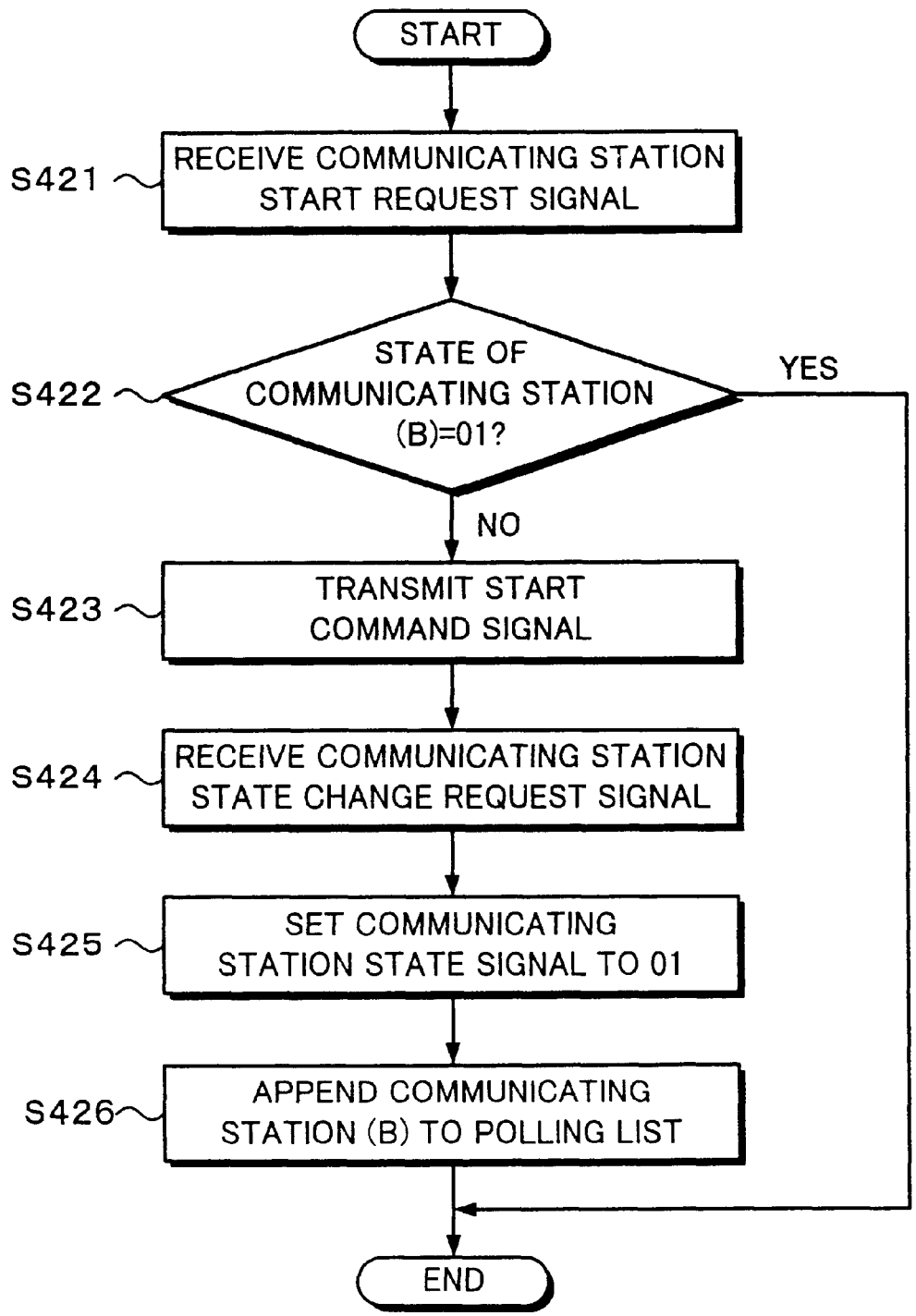

(COMMUNICATING STATION (B) SIDE)

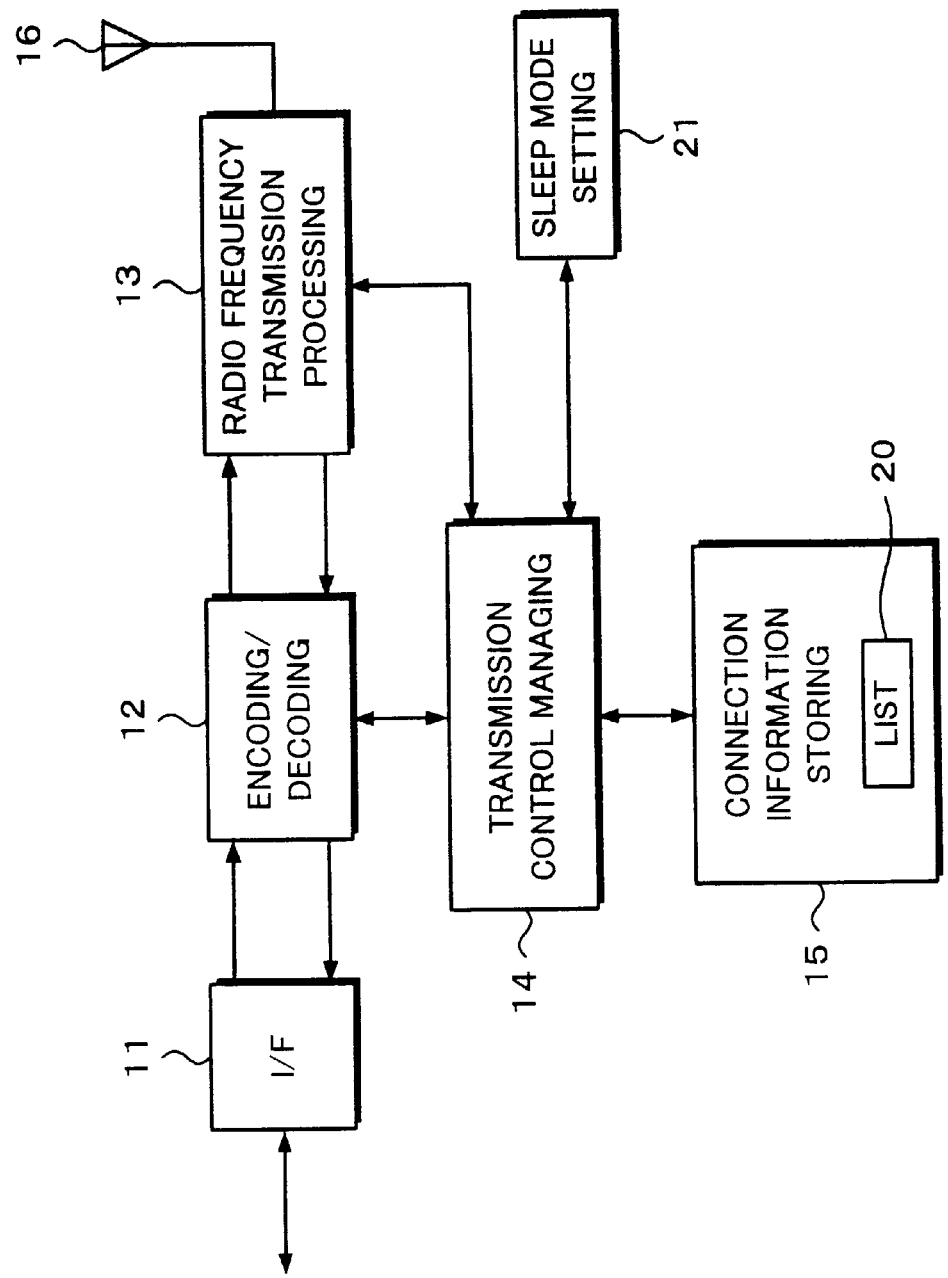

WIRELESS COMMUNICATING METHOD, WIRELESS COMMUNICATING SYSTEM, COMMUNICATING STATION, AND CONTROLLING STATION

BACKGROUND OF THE INVENTION

1. Field of the Invention

The present invention relates to a wireless communicating method, a wireless communicating system, a communicating station, and a controlling station suitable for wirelessly transmitting chronologically continuous data streams (such as digital audio data and digital video data) and asynchronous data (such as commands) for example between digital audio units or between digital video units.

2. Description of the Related Art

Audio units and video units have been digitized as with for example CD (Compact Disc) players, MD (Mini Disc) recorders/players, digital VCRs, digital cameras, and DVD (Digital Versatile Disc) players. As personal computers have become common, systems that connect such digital audio units or digital video units to personal computers have been proposed. As an interface that accomplishes a system that connects such digital audio units or such digital video units to a personal computer, IEEE (Institute of Electronics Engineers) 1394 is becoming attractive.

The IEEE 1394 interface supports both an isochronous transmission mode and an asynchronous transmission mode. The isochronous transmission mode is suitable for transmitting chronologically continuous data streams such as video data and audio data at high speed. The asynchronous transmission mode is suitable for transmitting various commands and files. Since the IEEE 1394 interface supports both the isochronous transmission mode and the asynchronous transmission mode, when the IEEE 1394 interface is used, video data and audio data can be transmitted between digital audio units and between digital video units, respectively. With a personal computer connected to such digital units through the IEEE 1394 interface, the user can easily control and edit video data and audio data.

The IEEE 1394 interface is a wired interface. To structure such a system with a wired interface, cable connections are required. In addition, such cable connections tend to become complicated. Moreover, with a wired interface, it is difficult to connect units that are disposed in different rooms.

Thus, a digital audio unit or a digital video unit and a personal computer are connected with a wireless LAN (Local Area Network) so as to wirelessly communicate therebetween. As examples of the wireless LAN, CSMA (Carrier Sense Multiple Access) method and polling method are known.

However, in the conventional CSMA method and polling method, data streams such as video data and audio data cannot be transmitted at high speed. To solve such a problem, as with IEEE 1394, a wireless LAN that supports both an isochronous transmission mode that allows data streams such as video data and audio data to be transmitted at high speed and an asynchronous transmission mode that allows asynchronous data such as commands and files to be transmitted has been developed.

When each unit wirelessly communicates data with another unit through a wireless LAN, only a unit that communicates with another unit is set to an operation state. The other units that do not communicate are set to a sleep state.

In other words, when one unit wirelessly communicates data with another unit through a wireless LAN, if the wireless node of each unit is in the operation state, the unit consumes power. In contrast, wireless nodes that do not communicate are set to the sleep state. In other words, power supply to unnecessary circuit portions may be stopped. Alternatively, the operation clock frequency may be lowered.

As described above, conventional wireless LANs use the CSMA method or polling method. However, in the CSMA method or polling method, there is no way to determine whether or not a communicating party is in the sleep state. Thus, since wireless nodes that communicate with other wireless nodes cannot be set to the sleep state, the power consumption cannot be easily reduced.

OBJECTS AND SUMMARY OF THE INVENTION

Therefore, an object of the present invention is to a wireless communicating method, a wireless communicating system, a communicating station, and a controlling station that cause a non-communicating wireless node that is connected to a wireless LAN to enter into a sleep state so as to reduce power consumption.

A first aspect of the present invention is a wireless communicating method for a system having a plurality of communicating stations and a controlling station for controlling an accessing operation of the communicating stations, the controlling station being disposed between the communicating stations, a communication signal being transmitted and received between each of the communicating stations and the controlling station, the communication signal having a control area and a data area structured as a frame on time division basis, the method comprising the steps of causing a communicating station to transmit a communicating station state change request signal to the control station, causing the control station to transmit a communicating station state signal to the communicating station so as to enter the relevant communicating station into a sleep state, and causing a communicating station in the sleep state to receive a start command signal that causes the relevant communicating station to cancel the sleep state.

A second aspect of the present invention is a wireless communicating system having a plurality of communicating stations and a controlling station for controlling an accessing operation of the communicating stations, a communication signal being transmitted and received between each of the communicating stations and the controlling station, the communication signal having a control area and a data area structured as a frame on a time division basis, wherein a communicating station transmits a communicating station state change request signal to the controlling station, wherein the controlling station transmits a communicating station state signal to the communicating station so as to cause the communicating station to enter into a sleep state, and wherein a communicating station in the sleep state receives a start command signal so as to cause the communicating station to cancel the sleep state.

A third aspect of the present invention is a communicating station of a wireless communicating system having a plurality of communicating stations and a controlling station for controlling an accessing operation of the communicating stations, a communication signal being transmitted and received between each of the communicating stations and the controlling station, the communication signal having a control area and a data area structured as a frame on a time division basis, the communicating station comprising a communicating station state change request signal transmitting means for transmitting a communicating station state change request signal with which a communicating station requests the controlling station to set the communicating station to the sleep state, a communicating station state signal receiving means for receiving a communicating station state signal that represents whether or not a communicating station is in the sleep state, a start command signal receiving means for receiving a start command signal that causes the communicating station to cancel the sleep state, and a controlling means for transmitting the communicating station state change request signal that requests the controlling station to set the communicating station to the sleep state, receiving the communicating station state signal that causes the relevant communicating station to enter the sleep state, and receiving the start command signal that causes the communicating station to cancel the sleep state.

A fourth aspect of the present invention is a controlling station of a wireless communicating system having a plurality of communicating stations and a controlling station for controlling an accessing operation of the communicating stations, a communication signal being transmitted and received between the communicating stations and the controlling station, the communication signal having a control area and a data area structured as a frame on a time division basis, the controlling station comprising a communicating station state signal transmitting means for transmitting a communicating station state signal that represents whether or not a communicating station is in a sleep state, a start command signal transmitting means for transmitting a start command signal that causes the relevant communicating station to cancel the sleep state, a communicating station state change request signal receiving means for receiving a communication state change request signal with which a communicating station requests the controlling station to set it to the sleep state, and a controlling means for causing a communicating station to transmit the communicating station state signal so as to cause the communicating station to enter into the sleep state, the controlling station to transmit the communicating station state signal corresponding to the communicating station state change request signal, and the controlling station to transmit the start command signal to the communicating station so as to cause it to cancel the sleep state.

A communicating station transmits a communicating station state change request signal to a controlling station. The controlling station transmits a communicating station state signal to the communicating station so as to enter the communicating station into a sleep state. Thus, the local station can enter into the sleep state by itself. In addition, the local station can be entered into the sleep state corresponding a command received from the controlling station. A communicating station in the sleep state always receives at least a start command signal. Thus, the communicating station in the sleep state can cancel the sleep state by itself. In addition, the sleep state of the communicating station can be canceled corresponding to a command received from the controlling station.

These and other objects, features and advantages of the present invention will become more apparent in light of the following detailed description of a best mode embodiment thereof, as illustrated in the accompanying drawings.

BRIEF DESCRIPTION OF THE DRAWINGS

FIGS. 6A and 6B are flow charts for explaining a polling accessing process;

FIG. 7 is a schematic diagram for explaining a polling list in sleep state;

FIG. 8 is a schematic diagram for explaining a polling list in high priority state;

FIGS. 9A and 9B are flow charts for explaining a sleep mode setting process;

FIGS. 10A and 10B are flow charts for explaining a sleep mode setting process;

FIGS. 12A, 12B, and 12C are flow charts for explaining a sleep mode setting process; and FIG. 13 is a block diagram showing an example of the structure of a wireless node of a wireless network system according to the present invention.

DETAILED DESCRIPTION OF THE PREFERRED EMBODIMENTS

Figure 1:
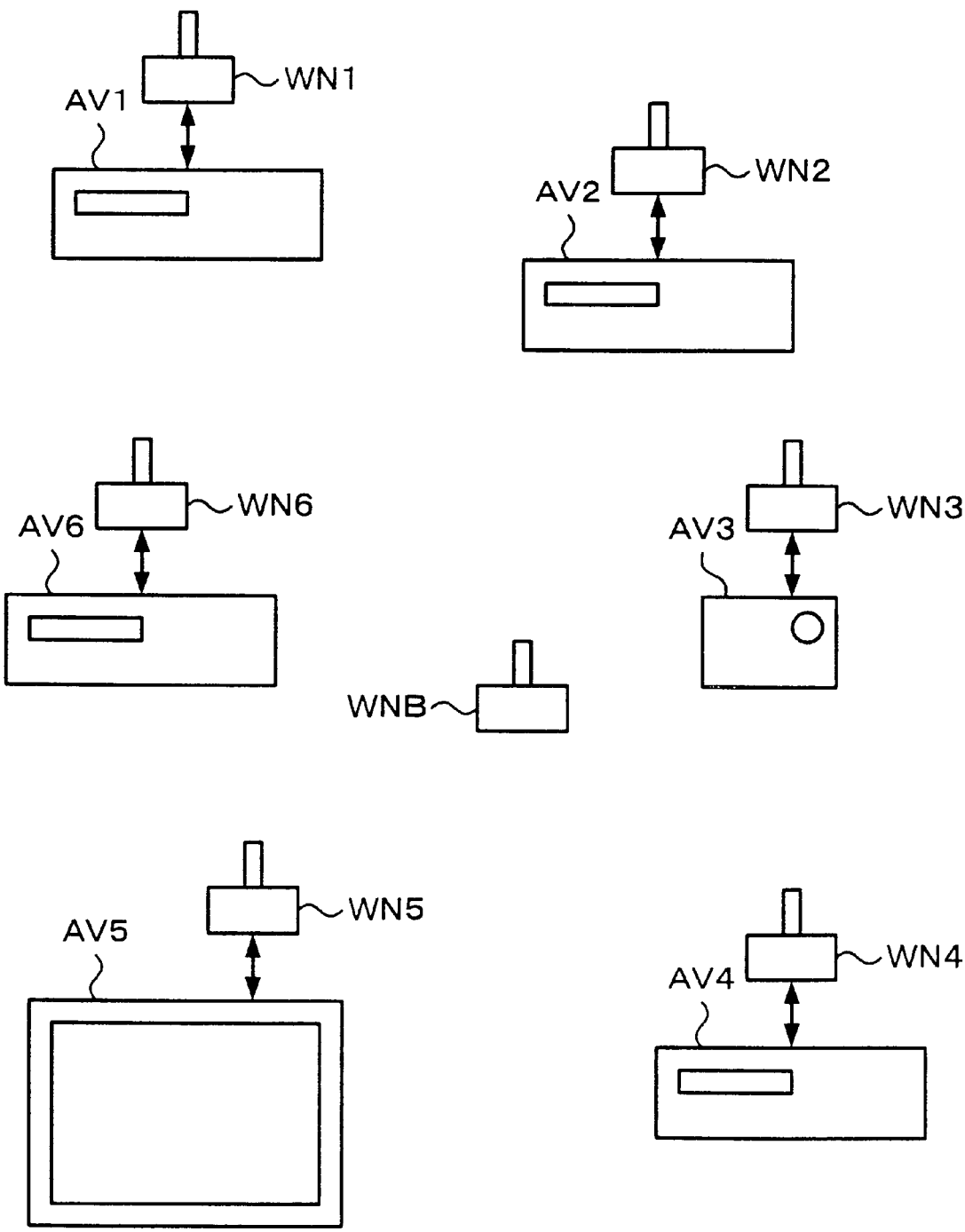
FIG. 1 is a schematic diagram showing examples of wireless network systems according to the present invention.

Next, with reference to the accompanying drawings, an embodiment of the present invention will be described. According to the present invention, as with the IEEE 1394 interface, a system that wirelessly transmits a data stream (such as video data or audio data) and asynchronous data (such as commands) is structured. FIG. 1 shows an outline of such a wireless network system.

In FIG. 1, WN1, WN2, WN3, . . . are wireless nodes as communicating stations. Digital audio units or digital video units AV1, AV2, . . . , such as a CD player, an MD recorder/player, a digital VCR, a digital camera, a DVD player, and a television receiver can be connected to the wireless nodes WN1, WN2, . . . . In addition, a personal computer can be connected to the wireless nodes WN1, WN2, WN3, . . . . Each of the digital audio units and digital video units AV1, AV2, . . . connected to the wireless nodes WN1, WN2, . . . has the IEEE 1394 digital interface. The wireless nodes WN1, WN2, . . . and the digital audio units and digital video units AV1, AV2, . . . are connected with the IEEE 1394 digital interface.

WNB is a wireless node as a controlling station. The wireless node WNB as the controlling station exchanges control data with the wireless nodes WN1, WN2, . . . as the communicating stations. The wireless nodes WN1, WN2, . . . as the communicating stations communicate each other under the control of the wireless node WNB as the controlling station. The wireless nodes WN1, WN2, . . . as the communicating stations wirelessly exchange chronologically continuous data streams (isochronous data) and asynchronous data such as commands.

Figure 2:
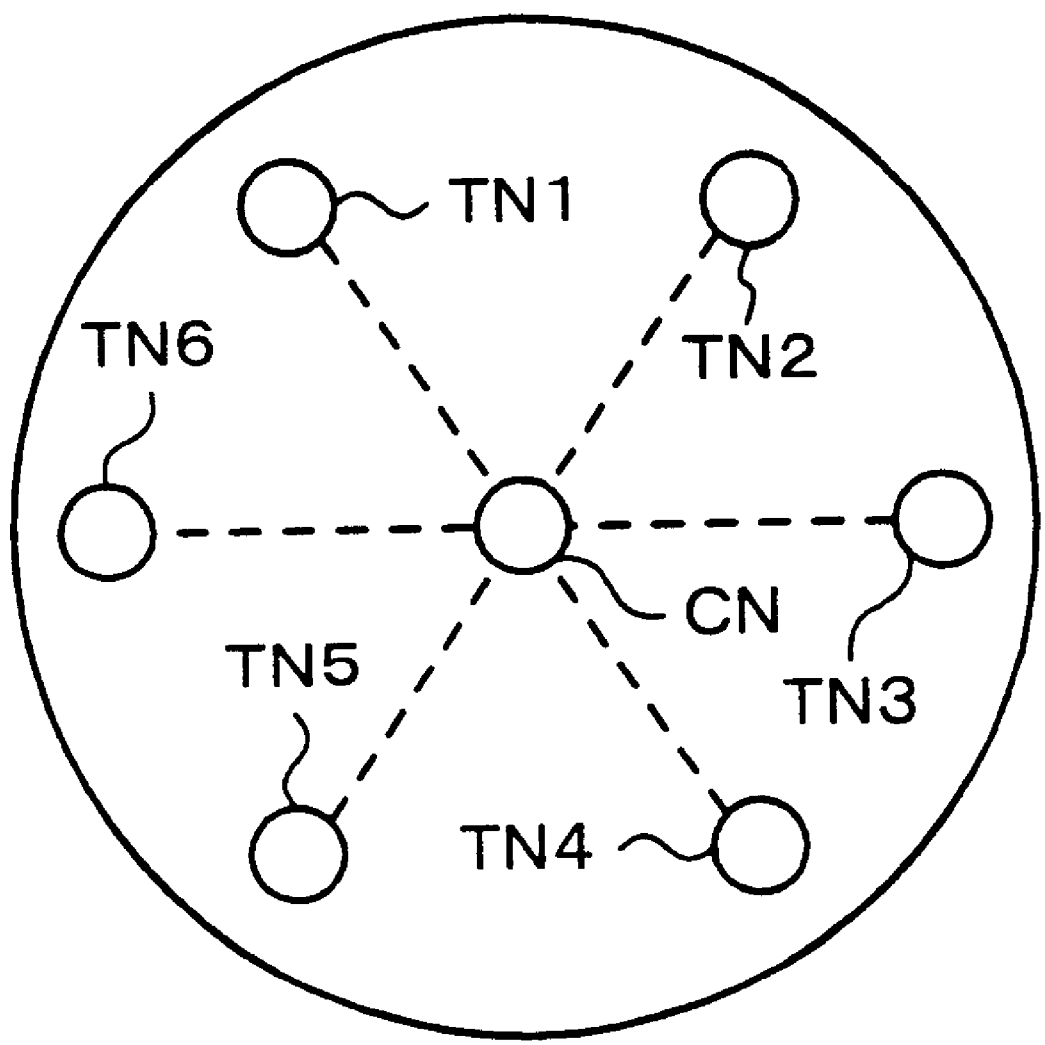
FIG. 2 is a schematic diagram for explaining a star type network system.

In this example, as shown in FIG. 2, a star type topology wireless LAN is structured. In the star type topology, the wireless LAN is composed of a central controlling station CN and peripheral terminal stations TN1, TN2, . . . . The terminal stations TN1, TN2, . . . exchange data under the control of the central controlling station CN. The central controlling station CN corresponds to the wireless node WNB. The terminal stations TN1, TN2, . . . correspond to the wireless nodes WN1, WN2, . . . . It should be noted that the structure of the wireless LAN is not limited to such a star type topology.

Control data, chronologically continuous data streams such as audio data and video data, and asynchronous data such as commands are transmitted between the wireless nodes WN1, WN2, . . . and the wireless node WNB. These types of data are transmitted as frames as shown in FIG. 3.

Figure 3:
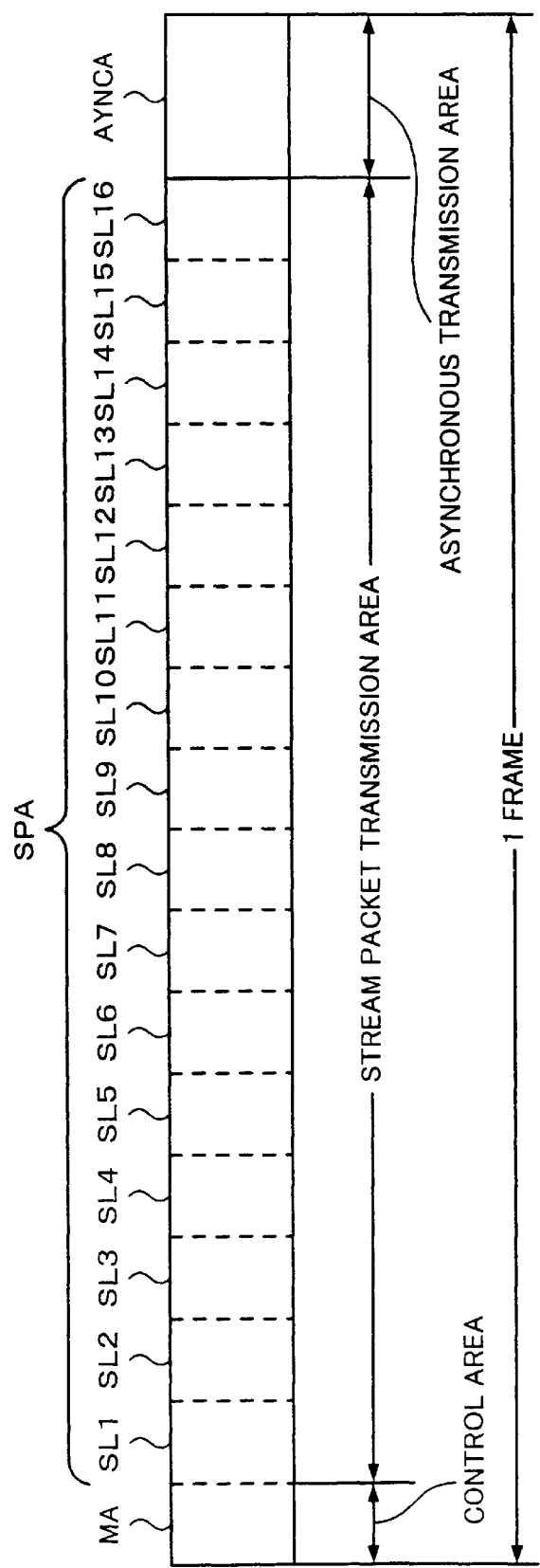
FIG. 3 is a schematic diagram for explaining the structure of one frame of a wireless network system.

In other words, FIG. 3 shows a frame structure of data transmitted between the wireless node WN1, WN2, . . . and the wireless node WNB. As shown in FIG. 3, at the beginning of one frame, a control area MA for management information such as network information is placed. The control area MA is followed by a stream packet transmission area SPA and an asynchronous transmission area ASYNCA. The stream packet transmission area SPA and the asynchronous transmission area ASYNCA compose a data transmission area.

The stream packet transmission area SPA is used for a high speed communication equivalent to the isochronous transmission mode of the IEEE 1394 interface. The stream packet transmission area SPA is composed of time slots SL1, SL2, . . . . The time slots SL1, SL2, . . . are units of which data is time-division multiplexed. The time slots are placed at intervals of a predetermined time period. In this example, the number of the time slots SL1, SL2, . . . is 16. With different time slots SL1, SL2, . . . , for example 16 data streams can be transmitted in the same system at a time.

In the above-described example, the number of time slots is 16. However, it should be noted that the number of time slots is not limited to 16. In addition, the time slots may be placed at any positions of a frame.

In the stream packet transmission area SPA, data streams are transmitted with the time slots SL1, SL2, . . . . At this point, the number of time slots SL1, SL2, . . . used for one data stream is not constant. For example, the bit rate of an MPEG (Moving Picture Experts Group) 2 data stream varies corresponding to its pattern or its motion. When the information amount of a data stream is large, the number of time slots SL1, SL2, . . . used for one data stream becomes large. In contrast, when the information amount of a data stream is small, the number of time slots SL1, SL2, . . . used for one data stream becomes small.

In the stream packet transmission area SPA, since data is transmitted at high speed, a data re-transmitting operation cannot be performed. Thus, an error correction code corresponding to block encoding method is added to the data to correct an error thereof.

The asynchronous transmission area ASYNCA is equivalent to the asynchronous transmission mode of the IEEE 1394 interface. Thus, the asynchronous transmission area ASYNCA is used for asynchronous data such as commands. When data in the asynchronous transmission area ASYNCA is transmitted, for an error-free transmission, an acknowledgment signal sent back from the remote party is checked. When an acknowledgment signal is not received, a data re-transmitting operation is performed.

As a transmission controlling method in the asynchronous transmission area ASYNCA, the wireless node WNB as the central controlling station polls the wireless nodes WN1, WN2, . . . as the communicating stations or detects carrier signals therefrom so as to prevent transmission requests from colliding on a transmission path.

When data streams are transmitted between the wireless nodes WN1, WN2, . . . , the time slots SL1, SL2, . . . are allocated by the wireless node WNB as the controlling station.

In other words, the wireless node WNB as the controlling station manages a communication state of the system and recognizes time slots that are being used. In addition, the wireless node WNB as the controlling station transmits management area information. With the management area information, each of the wireless node WN1, WN2, . . . can determine what time slots SL1, SL2, . . . are being used for what data streams.

The wireless node WNB as the controlling station polls the wireless nodes WN1, WN2, . . . as the communicating stations. When the wireless node WN1, WN2, . . . have issued data stream transmission requests through the polling operation, they are transmitted to the wireless node WNB as the controlling station. The wireless node WNB as the controlling station allocates the time slots SL1, SL2, . . . to the wireless nodes WN1, WN2, . . . that have issued the data transmission requests. In addition, the wireless node WNB as the controlling station transmits information of the newly allocated time slots SL1, SL2, . . . to the other wireless nodes WN1, WN2, . . . . The wireless nodes WN1, WN2, . . . that have been requested for the data transmission transmit data streams to the remote stations with the allocated time slots SL1, SL2, . . .

Figures 4, 5:
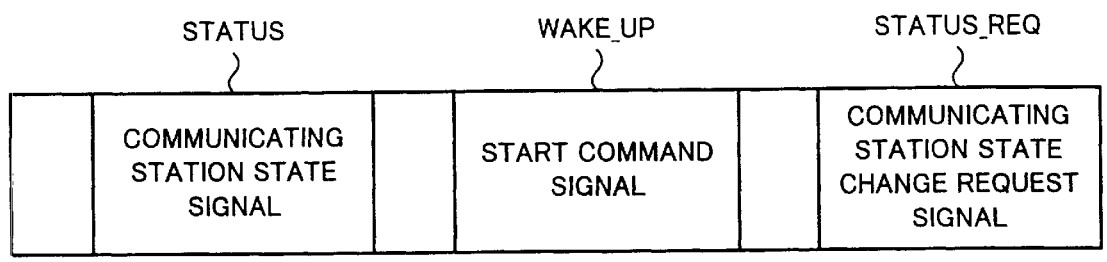
FIG. 4 is a schematic diagram for explaining the structure of a control area.
FIG. 5 is a schematic diagram for explaining a polling list.

In this example, as shown in FIG. 4, the control area MA at the beginning of each frame has a communicating station state signal STATUS, a start command signal WAKE-UP, and a communicating station state change request signal STATUS_REQ. The communicating station state signal STATUS, the start command signal WAKE-UP, and the communicating station state change request signal STATUS_REQ are used to control sleep state and high priority state of the wireless nodes WN1, WN2, . . . of the system.

The communicating station state signal STATUS represents the state of the local communicating station. The wireless node WNB as the controlling station periodically transmits the communicating station state signal STATUS. The communicating station state signal STATUS represents for example three states of sleep state, normal state, and high priority state. When the value of the communicating station state signal STATUS is "00", it represents the sleep state. When the value of the communicating station state signal STATUS is "01", it represents the normal state. When the value of the communicating station state signal STATUS is "10", it represents the high priority state.

The sleep state represents that the local wireless node is not communicating. In the sleep state, each of the wireless nodes WN1, WN2, . . . is in sleep mode. In the sleep mode, since only limited circuits operate, the power consumption is very small. Even in the sleep mode, each wireless node can receive at least the start command signal WAKE-UP so as to restore the normal state. When the wireless nodes WN1, WN2, . . . are in the sleep state, since they are not communicating, the wireless node WNB as the controlling station does not poll them.

The normal state represents that the local wireless node is normally operating. When the wireless nodes WN1, WN2, . . . are in the normal state, the controlling station WNB usually polls them.

The high priority state represents that the wireless node WNB as the controlling station exchanges parameters with the wireless nodes WN1, WN2, . . . in initializing mode. When the wireless nodes WN1, WN2, . . . are in the high priority state, the wireless node WNB as the controlling station more frequently polls the wireless nodes WN1, WN2, . . . than those in the normal state.

The start command signal WAKE_UP causes the communicating stations WN1, WN2, . . . to cancel the sleep state. When the wireless nodes WN1, WN2, that are in the sleep state receive the start command signal WAKE_UP, they cancel the sleep state and enter the normal state.

The communicating station state change request signal STATUS_REQ is transmitted so as to change the current state. The communicating station state change request signal is transmitted from the wireless nodes WN1, WN2, . . . as the communicating stations. When the wireless nodes WN1, WN2, . . . as the communicating stations that are in the normal state enter the sleep state, they transmit the communicating station state change request signal STATUS_REQ to the wireless node WNB as the controlling station so as to enter the sleep state.

In this example, the wireless node WNB as the controlling station polls the wireless nodes WN1, WN2, . . . as the communicating stations. As shown in FIG. 5, the wireless node WNB as the controlling station has a polling list. The wireless node WNB as the controlling station polls the wireless nodes WN1, WN2, . . . corresponding to the polling list.

Figure 6B:
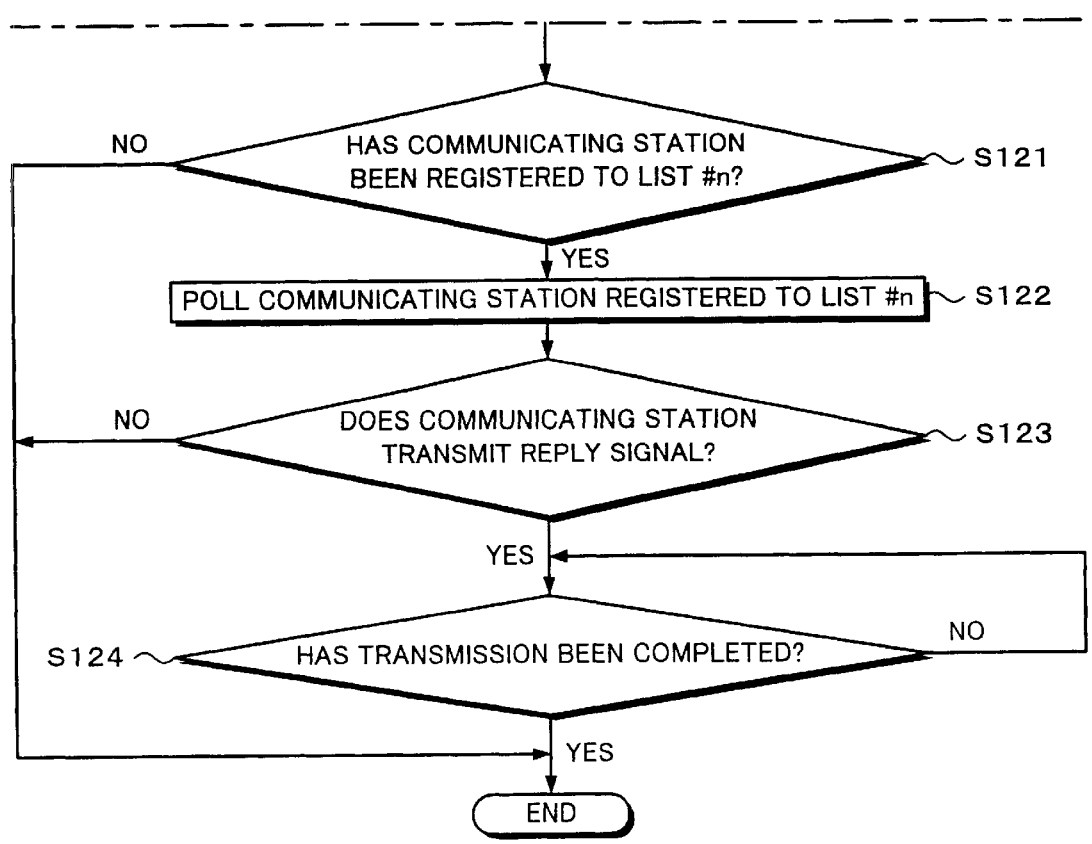

FIGS. 6A and 6B are flow charts showing a polling process performed by the controlling station. In FIGS. 6A and 6B, the wireless node WNB determines whether or not a wireless node has been registered to list number #1 (at step S101). When the determined result at step S101 is Yes, the wireless node WNB polls the wireless node registered to the list number #1 (at step S102). Thereafter, the wireless node WNB determines whether the wireless node registered to the list number #1 transmits a reply signal to the wireless node WNB (at step S103). When the determined result at step S103 is Yes, the wireless node WNB determines whether or not the transmission of the reply signal has been completed (at step S104). When the determined result at step S104 is Yes, the wireless node WNB performs the polling process for the next node. When the determined result at step S101 is No, the wireless node WNB performs the polling process for the next node.

Thereafter, the wireless node WNB determined whether or not a wireless node has been registered to list number #2 (at step S111). When the determined result at step Sill is Yes, the wireless node WNB polls the wireless node registered to the list number #2 (at step S112). Thereafter, the wireless node WNB determines whether or not the wireless node registered to the list number #2 transmits a reply signal (at step S113). When the determined result at step S113 is Yes, the wireless node WNB determines whether or not the transmission of the reply signal has been completed (at step S114). Thereafter, the wireless node performs the polling process for the next wireless node. When the determined result at step S111 is No, the wireless node WNB performs the polling process for the next node.

Thereafter, the wireless node WNB repeats the similar process. In other words, the wireless node WNB determines whether or not a wireless node has been registered the last list number #n (at step S121). When the determined result at step S121 is Yes, the wireless node WNB polls the wireless node registered to the list number #n (at step S122). Thereafter, the wireless node WNB determines whether or not the wireless node registered to the list number #n transmits a reply signal (at step S123). When the determined result at step S123 is Yes, the wireless node WNB determines whether or not the transmission of the reply signal has been completed (at step S124). When the determined result at step S124 is Yes, the wireless node WNB completes the polling process. When the determined result at step S121 is No, the wireless node WNB completes the polling process.

With the polling list shown in FIG. 5, the wireless node WNB polls the wireless node WN1 registered to the list number #1 and the wireless node WN2 registered to the list number #2. Thereafter, corresponding to the polling list, the wireless node WNB polls the wireless nodes WN3, WN4, . . . .

As described above, in the system according to the present invention, each wireless node can be set to one of the normal state, the sleep state, and the high priority state. In the normal state, the wireless node WNB successively polls the wireless nodes WN1, WN2, . . . . When the wireless nodes WN1, WN2, . . . are set to the sleep state, the wireless node WNB does not poll them. When the wireless nodes WN1, WN2, . . . are set to the high priority state, the wireless node WNB more frequently polls the wireless nodes WN1, WN2, than those in the normal state. The states of the wireless nodes WN1, WN2, . . . are controlled by changing the contents of the polling list.

FIG. 7 shows the polling list in the case that the wireless node WN3 is set to the sleep state. As shown in FIG. 7, although the wireless nodes WN1 and WN2 have been registered to the list numbers #1 and #2, respectively, the wireless node WN3 has not been registered to the list number #3. With the polling list shown in FIG. 7, the wireless node WNB polls the wireless nodes WN1, WN2, and WN4, rather than the wireless node WN3. Thus, when the wireless node WN3 is set to the sleep state, the wireless node WN3 is removed from the polling list. Thus, the wireless node WNB does not poll the wireless node WN3.

FIG. 8 shows the polling list in the case that the wireless node WN1 is set to the high priority state. In this case, as shown in FIG. 8, the wireless node WN1 has been registered to the list number #1. The wireless node WN2 has been registered to the list number #2. The wireless node WN1 has been registered to the list number #3. The wireless node WN3 has been registered to the list number #4. The wireless node WN1 has been registered to the list number #5. With the polling list shown in FIG. 8, the wireless node WNB successively polls the wireless nodes WN1, WN2, WN1, WN3, WN1, . . . . In other words, the wireless node WNB polls the wireless node WN1 every another wireless node. Thus, when a particular wireless node is set to the high priority state, it is registered on the polling list a plurality of times. Thus, the wireless node WNB frequently polls the polling node that has been set to the high priority state.

In the above-described example, a wireless node that has been set to the high priority state is polled every another wireless node. However, the present invention is not limited to such a polling operation. Instead, a wireless node that has been set to the high priority state may be polled every two other wireless nodes or every three other wireless nodes. Alternatively, a wireless node that has been set to the high priority state may be successively polled a plurality of times.

Next, a sleep state setting process will be described. In the system according to the present invention, as shown in FIG. 4, the control area MA at the beginning of each frame has the communicating station state signal STATUS, the start command signal WAKE-UP, and the communicating station state change request signal STATUS_REQ. The communicating station state signal STATUS, the start command signal WAKE-UP, and the communicating station state change request signal STATUS_REQ are used to control the sleep state.

First, a process for setting the wireless node WN1, WN2, . . . as a communicating station to the sleep mode will be described. FIGS. 9A and 9B are flow charts showing a process for causing the wireless node WN1, WN2, . . . side to enter the sleep state corresponding to a request received from the wireless node WN1, WN2, . . . side as a communicating station. FIG. 9A shows a process performed on the wireless node WN1, WN2, . . . side as a communicating station. FIG. 9B shows a process performed on the wireless node WNB side as a controlling station.

As shown in FIG. 9A, to enter a wireless node as a communicating station into the sleep state, the wireless node transmits the communicating station state change request signal STATUS_REQ that causes the state of the communicating station to the sleep state (state=00) (at step S101).

As shown in FIG. 9B, when the wireless node side as the controlling station has received the communicating station state change request signal STATUS_REQ (at step S121), the wireless node side as the controlling station determines whether or not the current state of the wireless node as the communicating station is the sleep state (state=00) corresponding to the communicating station state signal STATUS (at step S122). When the determined result at step S122 is No, the wireless node side as the controlling station sets the communicating station state signal STATUS to "00" so as to enter the wireless node as the communicating station into the sleep state (at step S123). The wireless node side as the controlling station deletes the wireless node as the communicating station from the polling list (at step S124). Thereafter, the flow returns to step S121. When the determined result at step S122 is Yes, since it is not necessary to change the state, the flow returns to step S121.

After the wireless node side as the communicating station has transmitted the communicating station state change request signal STATUS_REQ, the wireless node side as the communicating station receives the communicating station state signal STATUS (at step S102).

After the wireless node side as the communicating station has transmitted the communicating state change request signal STATUS_REQ at step S101 and the communicating state change request signal STATUS_REQ has been set to the sleep state at step S123, the flow advances to step S102. At step S102, the wireless node side as the communicating station receives the communicating station state signal STATUS that has been set to the sleep state.

After the wireless node side as the communicating station has received the communicating station state signal STATUS at step S102, the wireless node state side as the communicating station determines whether or not the communicating station state signal STATUS has been set to the sleep state (state=00) (at step S103). When the determined result at step S103 is Yes, the wireless node as the communicating station sets the mode to the sleep mode by itself (at step S104) and completes the process. When the determined result at step S103 is No, the flow returns to step S101. At step S101, the wireless node as the communicating station repeats the process.

Thus, when the wireless node WN1, WN2, . . . side enters the sleep state corresponding to a request received from the wireless node WN1, WN2, . . . side as a communicating station, the wireless node WN1, WN2, . . . side as the communicating station transmits the communicating station state change request signal STATUS_REQ to the wireless node WNB as the controlling station. The wireless node WNB as the controlling station sets the communicating station state signal STATUS to the sleep state so as to stop the polling operation for the communicating station in the sleep state. When the wireless node WN1, WN2, . . . side receives the communicating station state signal STATUS that has been set to the sleep state, the wireless node WN1, WN2, . . . side enters the sleep mode.

Figure 10A:
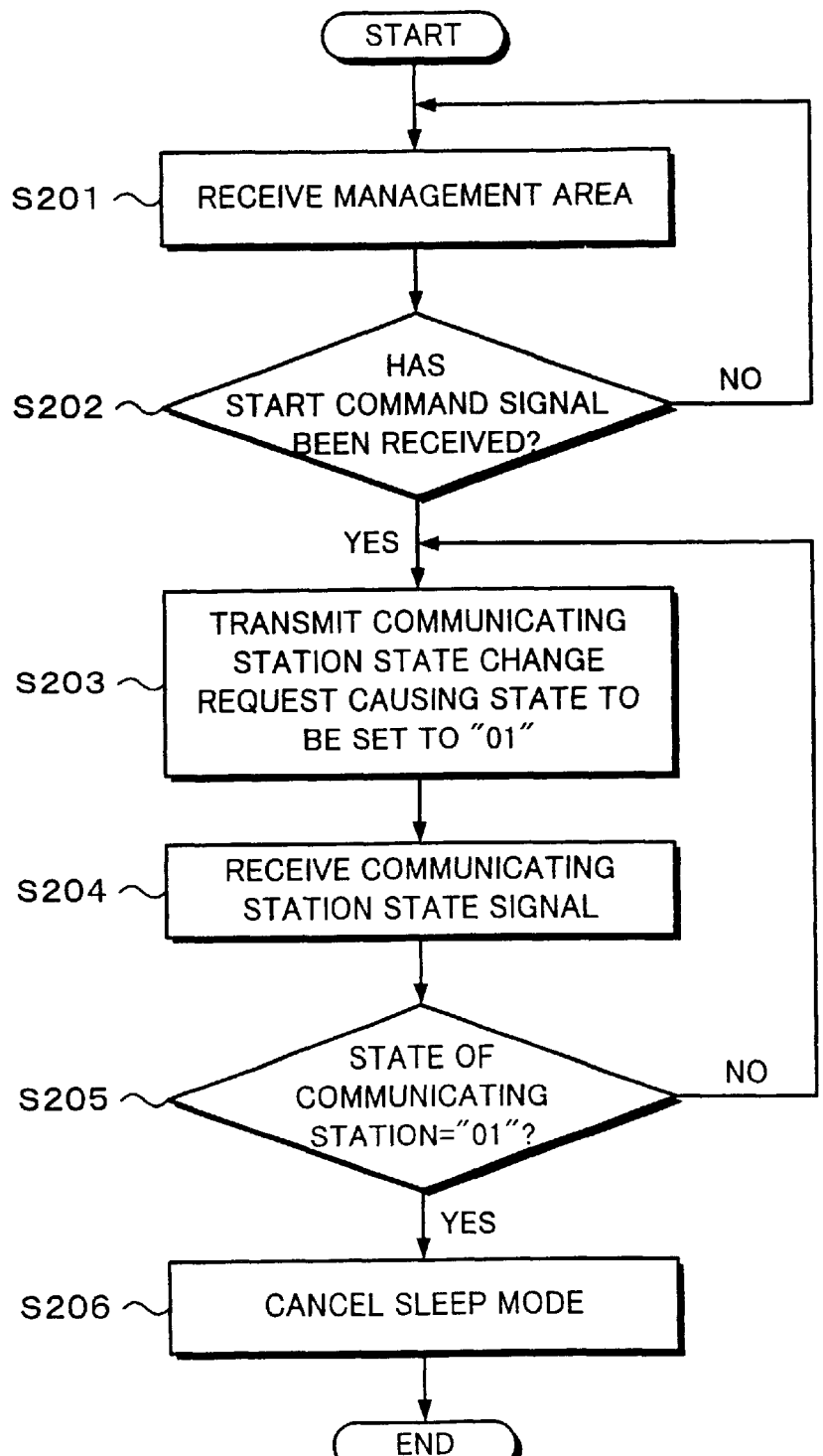

Next, a process for setting the wireless node WN1, WN2, . . . that is in sleep state to normal state will be described. FIGS. 10A and 10B show a process of which a wireless node WNB as a controlling station causes a wireless node that is in the sleep state to enter the normal state. FIG. 10A shows a process performed on the wireless node WN1, WN2, . . . side as a communicating station. FIG. 10B shows a process performed on the wireless node WNB side as a controlling station.

As described above, when a wireless node as a communicating station is in the sleep state, the wireless node has been set to the sleep mode. In the sleep mode, the wireless node can receive at least the start command signal WAKE_UP of the control area MA at the beginning of each frame.

The wireless node side as the communicating station in the sleep state receives the control area MA at the beginning of the frame (at step S201) and determines whether or not the start command signal WAKE_UP has been received (at step S202).

As shown in FIG. 10B, the wireless node as the controlling station transmits the start command signal WAKE_UP to a wireless node so as to cancel the sleep state (at step S222).

When the wireless node as the communicating station in the sleep state has received the start command signal WAKE_UP at step S202, the wireless node transmits the communicating station state change request signal STATUS_REQ to the wireless node as the controlling station (at step S203).

The controlling station receives the communicating station state change request signal STATUS_REQ (at step S222). The controlling station determines whether or not the current state of the communicating station is the normal state (at step S223). When the determined result at step S223 is No, the controlling station sets the communicating station state STATUS to the normal state (at step S224). The controlling station appends the wireless node as the communicating station to the polling list (at step S225) and completes the process. When the determined result at step S223 is Yes, since it is not necessary to change the state, the controlling station completes, the process.

After the wireless node side as the communicating station in the sleep state has transmitted the communicating station state change request signal STATUS_REQ at step S203, the wireless node side receives the communicating station state signal STATUS (at step S204).

The wireless node side as the communicating station has transmitted the communicating station state change request signal STATUS_REQ to the wireless node as the controlling station at step S203. The wireless node as the controlling station has set the communicating station state STATUS to the normal state at step S224. Thus, the wireless node side as the communicating station receives the communicating station state signal STATUS that has been set to the normal state (state=01) at step S224.

After the wireless node side as the communicating unit has received the communicating station state signal STATUS, the wireless node side determines whether or not the communicating station state signal STATUS has been set to the normal state (state=01) (at step S205). When the determined result at step S205 is Yes, the wireless node as the communicating station cancels the sleep state (at step S206) and completes the process. When the determined result at step S205 is No, the flow returns to step S203. At step S203, the wireless node as the communicating station repeats the process.

Thus, when the wireless node WN1, WN2, . . . in the sleep state is entered into the normal state under the control of the wireless node WNB as the controlling station, the wireless node WNB as the controlling station transmits the start command signal WAKE_UP to the wireless node WN1, WN2, . . . in the sleep state. After the wireless node WN1, WN2, . . . in the sleep state has received the start command signal WAKE_UP, the wireless node WN1, WN2, . . . transmits the communicating station state change request signal STATUS_REQ to the wireless node as the communicating station so as to enter the wireless node WN1, WN2, . . . to enter the normal state.

Figure 11A:
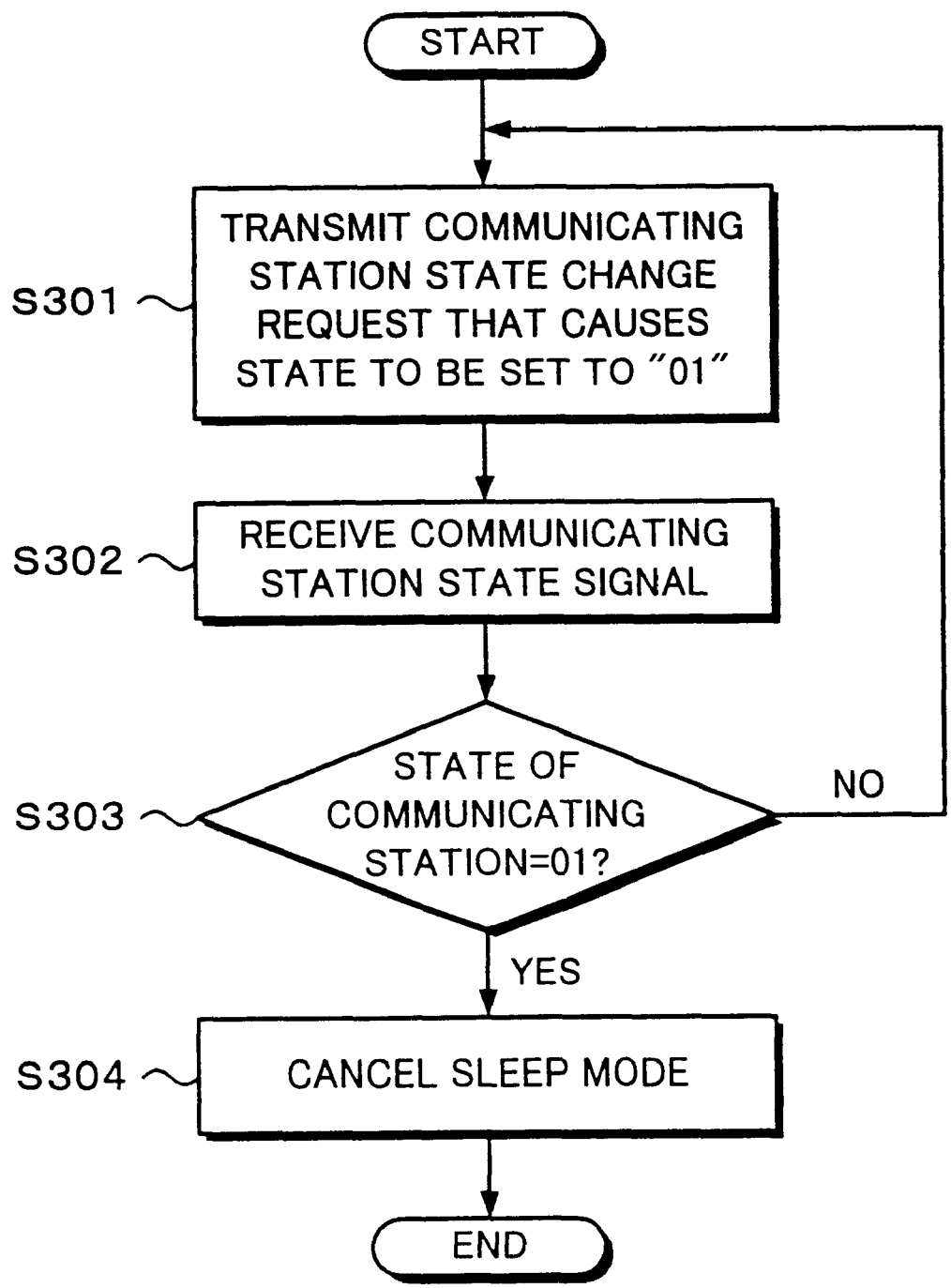
FIGS. 11A and 11B are flow charts for explaining a sleep mode setting process.
Figure 11B:
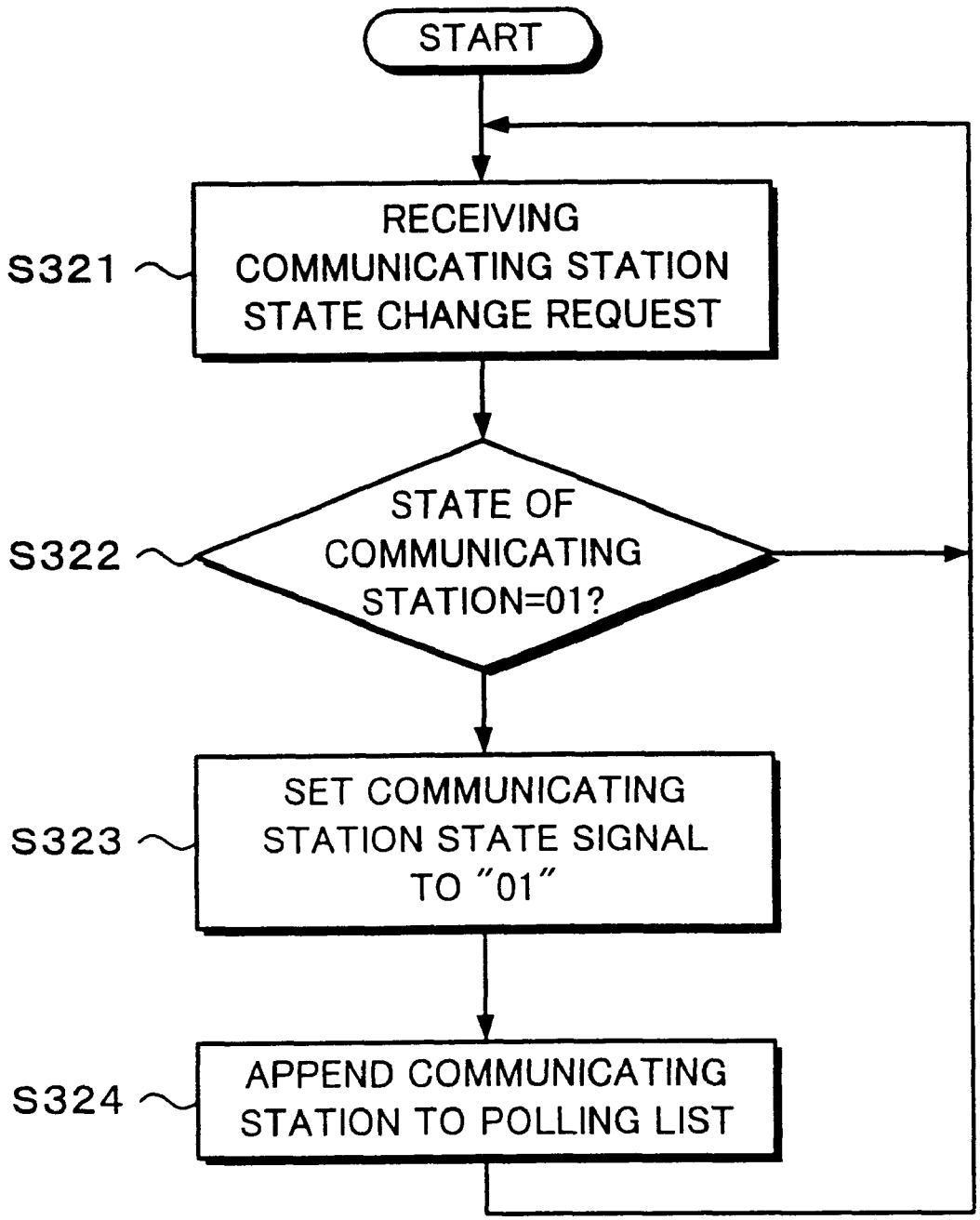

FIGS. 11A and 11B show a process of which the wireless node WN1, WN2, . . . side as a communicating station in the sleep state enters the normal state by itself. FIG. 11A shows a process performed on the wireless node WN1, WN2, . . . side as the communicating station. FIG. 11B shows a process performed on the wireless node WNB side as a controlling station.

As shown in FIG. 11A, the wireless node as the communicating station in the sleep state transmits the communicating station state change request signal STATUS_REQ that causes the wireless node to enter the normal state (state=01) (at step S301).

The wireless node side as the controlling station receives the communicating station state change request signal STATUS_REQ from the communicating station (at step S321). The controlling station determines whether or not the current state of the communicating station is the normal state (state=01) (at step S322). When the determined result at step S322 is No, the controlling station sets the communicating station state change request signal STATUS_REQ to the normal state (at step S323). The controlling station appends the wireless node as the communicating station to the polling list (at step S324) and completes the process. When the determined result at step S222 is Yes, since it is not necessary to change the state, the controlling station completes the process.

After the wireless node side as the communicating station in the sleep state has transmitted the communicating station state change request signal STATUS_REQ that causes the wireless node side to enter the normal state, the wireless node side receives the communicating station state signal STATUS (at step S302).

The wireless node side as the communicating station has transmitted the communicating station state change request signal STATUS_REQ to the controlling station at step S301. The wireless node as the controlling station has set the communicating station state signal STATUS to the normal state at step S323. Thus, the wireless node side as the communicating station receives the communicating station state signal STATUS that has been set to the normal state (state=01) at step S302.

After the wireless node as the communicating station has received the communicating station state signal STATUS, the wireless node side determines whether or not the communicating station state signal STATUS has been set to the normal state (state=01) (at step S303). When the determined result at step S303 is Yes, the wireless node as the communicating station cancels the sleep state (at step S304) and completes the process. When the determined result at step S303 is No, the flow returns to step S301. At step S301, the wireless node as the communicating station repeats the process.

When the wireless node WN1, WN2, . . . side in the sleep state enters the normal state by itself, it transmits the communicating station state change request signal STATUS_REQ that causes it to enter the normal state. Thus, the wireless node WN1, WN2, . . . side in the sleep state is entered into the normal state.

Figure 12A:
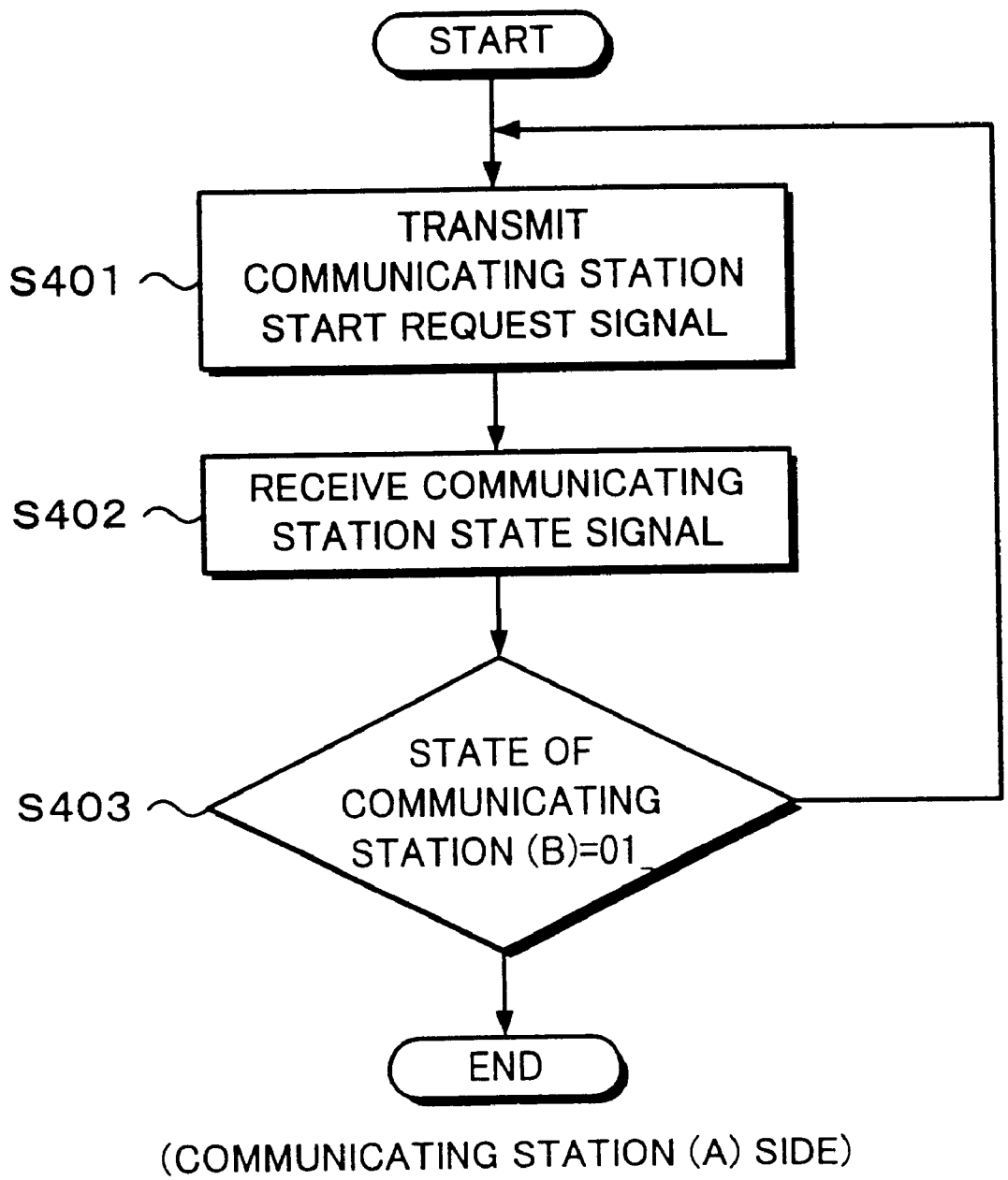
Figure 12C:
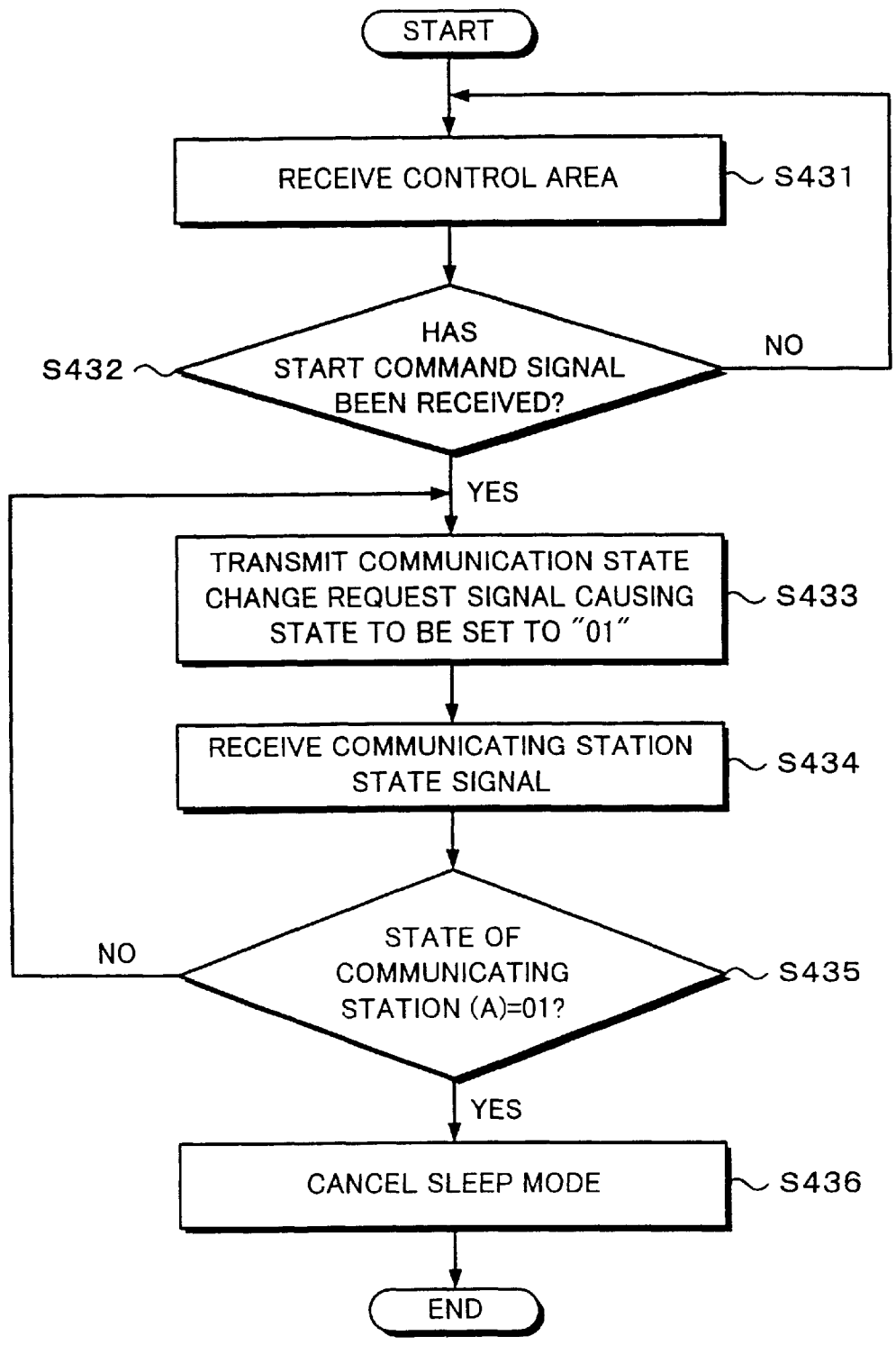

FIGS. 12A, 12B, and 12C show a process of which the wireless node WN1, WN2, . . . as a communicating station (A) causes the wireless node WN1, WN2, . . . as a communicating station (B) to enter into the sleep state. FIG. 12A shows a process performed on the wireless node WN1, WN2, . . . side as the communicating station (A) that communicates with the communicating station (B) in the sleep state. FIG. 12B shows a process performed on the wireless node WNB side as the controlling station. FIG. 12C shows a process performed on the wireless node WN1, WN2, . . . side as the communicating station (B) in the sleep state.

When a communicating station (A) wants to communicate with a wireless node in the sleep state, as shown in FIG. 12A, the wireless node as the communicating station (A) transmits the communicating station start request signal that causes the wireless node as the communicating station (B) to enter the normal state (at step S401). The communicating station start request signal may be transmitted with control area MA or data area.

The wireless node as the controlling station receives the communicating station start request signal (at step S421) and determines whether or not the current state of the communicating station (B) is the normal state (state=01) (at step S422).

When the determined result at step S422 is Yes, since the communicating station (B) is in the normal state, the controlling station completes the process.

When the determined result at step S422 is No, the wireless node as the controlling station transmits the start command signal WAKE_UP to the wireless node as the communicating station (B) (at step S423).

As shown in FIG. 12C, the wireless node as the communicating station (B) in the sleep state receives the control area MA (at step S431) and determines whether or not the start command signal WAKE_UP has been received (at step S432). When the determined result at step S431 is Yes, the communicating station (B) transmits the communicating station state change request signal STATUS_REQ that causes the state to be set to the normal state to the wireless node as the controlling station (at step S433).

As shown in FIG. 12B, the wireless node as the controlling station receives the communicating station state change request signal STATUS_REQ from the communicating station (B) (at step S424) and sets the communicating station state signal STATUS to the normal state (at step S425). The wireless node as the controlling station appends the wireless node as the communicating station (B) to the polling list (at step S426) and completes the process.

After the wireless node side as the communicating station (B) in the sleep state has transmitted the communicating station state change request signal STATUS_REQ that causes the state to be set to the normal state (state=01) (at step S433), the wireless node side as the communicating station (B) receives the communicating station state signal STATUS (at step S434). Thereafter, the wireless node as the communicating station (B) determines whether or not the communicating station state signal STATUS has been set to the normal state (state=01) (at step S435). When the determined result at step S435 is Yes, the wireless node as the communicating station (B) cancels the sleep mode and completes the process. When the determined result at step S435 is No, the flow returns to step S433. At step S433, the wireless node as the communicating station (B) repeats the process.

As shown in FIG. 12A, the wireless node side as the communicating station (A) receives the communicating station state signal STATUS from the communicating station (B) (at step S402). The wireless node side as the communicating station (A) determines whether or not the communicating station state signal STATUS of the communicating station (B) has been set to the normal state (state=01) (at step S403). When the determined result at step S403 is Yes, since the sleep mode of the communicating station (B) has been canceled, the communicating station (A) completes the process. When the determined result at step S403 is No, the flow returns to step S401. At step S401, the wireless node as the communicating station (A) repeats the process.

In the system according to the present invention, the control area MA at the beginning of each frame has the communicating station state signal STATUS, the start command signal WAKE_UP, and the communicating station state change request signal STATUS_REQ. With the communicating station state signal STATUS, the start command signal WAKE_UP, and the communicating station state change request signal STATUS_REQ, the wireless nodes WN1, WN2, . . . in the system can be set to the sleep state.

Next, the structure of each of the wireless nodes WN1, WN2, . . . and WNB will be described. FIG. 13 shows the structure of each of the wireless nodes WN1, WN2, . . . , and WNB. The structure of the wireless node WNB as the controlling station is basically the same as the structure of each of the wireless nodes WN1, WN2, . . . as the communicating stations.

As shown in FIG. 13, each of the wireless nodes WN1, WN2, . . . and WNB has an IEEE 1394 digital interface 11. The IEEE 1394 digital interface 11 supports chronologically continuous data (isochronous data) such as digital audio data and digital video data and asynchronous data such as commands.

In addition, each of the wireless nodes WN1, WN2, . . . . WNB has an encoding/decoding portion 12, a radio frequency transmission processing portion 13, a transmission control managing portion 14, and a connection information storing portion 15.

The encoding/decoding portion 12 encodes transmission data and decodes reception data. When a data stream is transmitted, the encoding/decoding portion 12 performs an error correction code encoding process for the data stream with a block code. In addition, the encoding/decoding portion 12 performs the error correcting process for reception data.

The radio frequency transmission processing portion 13 modulates the transmission signal, converts the resultant signal into a signal of a predetermined frequency, amplifies the resultant signal in a desired power level, extracts a signal of a predetermined frequency from the reception signal, converts the resultant signal into a signal of an intermediate frequency, and demodulates the resultant signal. A variety of modulating methods have been proposed. Examples of the modulating methods are QPSK and multi-value QAM modulating method. Alternatively, the resultant data may be secondarily modulated by spectrum dispersing method or OFDM (Orthogonal Frequency Division Multiplexing) method.

The transmission control managing portion 14 manages the data transmission. In other words, as described above, in this system, data is transmitted as frames. Data streams such as digital video data are transmitted with time slots. When asynchronous data is transmitted, the transmission control managing portion 14 determines whether data has been transmitted corresponding to an acknowledgment signal. When data has not been transmitted, the transmission control managing portion 14 performs a re-transmitting operation.

The connection information storing portion 15 stores network connection information that represents what transmission uses what time slots. The connection information is transmitted and received as management area information. In addition, the connection information storing portion 15 stores the polling list 20. The polling list 20 is used when the wireless node WNB as the controlling station polls the wireless nodes WN1, WN2, . . . as the communicating stations.

Each of the wireless nodes WN1, WN2, . . . and WNB has a sleep mode setting portion 21. When the local wireless node is not used, the sleep mode setting portion 21 sets the node to the sleep mode. The sleep mode setting portion 21 determines whether or not the current node has operated for a predetermined time period. When the node has not operated for the predetermined time period, the sleep mode setting portion 21 sets the current node to the sleep mode. In the sleep mode, the power to circuits other than required circuits is stopped. In addition, the clock frequency is decreased. In the sleep mode, at a timing of the start command signal WAKE_UP in the control area MA at the beginning of each frame, a signal is received.

When management information is transmitted, control information is output from the transmission control managing portion 14 to the encoding/decoding portion 12. At a timing of the control area MA at the beginning of each frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined frequency, and amplifies the resultant signal in a desired power level. An output signal of the radio frequency transmission processing portion 13 is transmitted from the antenna 16.

When a data stream is transmitted, the data stream is supplied to the encoding/decoding portion 12 through the digital interface 11. The encoding/decoding portion 12 adds an error correction code as a block code to the data stream. Under the control of the transmission control managing portion 14, the data stream is allocated to predetermined time slots. In the time period of the allocated time slot, an output signal of the encoding/decoding portion 12 is supplied to the radio frequency transmission processing portion 13. The radio frequency transmission processing portion 13 modulates the signal in a predetermined modulating method, converts the signal into a signal of a predetermined transmission frequency, amplifies the resultant signal in a desired power level, and transmits the resultant signal from the antenna 16.

When asynchronous data is transmitted, the asynchronous data is supplied to the encoding/decoding portion 12 through the digital interface 11. The encoding/decoding portion 12 arranges the asynchronous data into a predetermined data sequence. Since a re-transmitting operation is performed for the asynchronous data, an error correction code encoding process is not performed for the asynchronous data. Under the control of the transmission control managing portion 14, the transmission timing of the data is designated. In the time period of the asynchronous transmission area ASYNCA at the end of the frame, an output signal of the encoding/decoding portion 12 is supplied to the radio frequency transmission processing portion 13. The radio frequency transmission processing portion 13 modulates the signal in a predetermined modulating method, converts the resultant signal into a signal of a predetermined transmission frequency, amplifies the resultant signal in a desired power level, and transmits the resultant signal from the antenna 16.

When data is received, a signal that is received from the antenna 16 is supplied to the radio frequency transmission processing portion 13. The radio frequency processing portion 13 converts the reception signal into a signal of an intermediate frequency, and demodulates the resultant signal into a base band signal.

When information in the control area MA is received, in the time period of the control area MA, under the control of the transmission control managing portion 14, an output signal of the radio frequency transmission processing portion 13 is supplied to the encoding/decoding portion 12. The encoding/decoding portion 12 decodes the information in the control area MA. The information in the control area MA is supplied to the transmission control managing portion 14.

When a data stream is received, under the control of the transmission control managing portion 14, in the time period of a predetermined time slot in the stream packet transmission area, an output signal of the radio frequency transmission processing portion 13 is supplied to the encoding/decoding portion 12. The encoding/decoding portion 12 performs an error correcting process for the data stream transmitted with the predetermined time slots. An output signal of the encoding/decoding portion 12 is supplied to a predetermined unit through the digital interface 11.

As described above, in the system according to the present invention, the communicating station state signal STATUS, the start command signal WAKE_UP, and the communication state change signal STATUS_REQ are placed in the control area MA at the beginning of each frame. With the communication state change signal STATUS_REQ, the sleep operation can be controlled.

The length of one frame and the lengths of the stream transmission area and asynchronous transmission area are designated corresponding to transmission conditions. In this example, the asynchronous transmission area is preceded by the stream transmission area. However, the present invention is not limited to such an arrangement. Instead, the stream transmission area may be preceded by the asynchronous transmission area.

A communicating station transmits a communicating station state change request signal to a controlling station. The controlling station transmits a communicating station state signal to the communicating station so as to enter the communicating station into a sleep state. Thus, the local station can enter into the sleep state by itself. In addition, the local station can be entered into the sleep state corresponding a command received from the controlling station. A communicating station in the sleep state always receives at least a start command signal. Thus, the communicating station in the sleep state can cancel the sleep state by itself. In addition, the sleep state of the communicating station can be canceled corresponding to a command received from the controlling station.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A wireless communicating method for a system having a plurality of communicating stations and a controlling station for controlling an accessing operation of the plurality of communicating stations, the controlling station being disposed between the communicating stations, a communication signal being transmitted and received between each of the plurality of communicating stations and the controlling station, the communication signal having a control area and a data area structured as a frame on a time division basis, the method comprising the steps of:

causing a selected one of the plurality of communicating stations to transmit a communicating station state change request signal to the control station;

causing the control station to transmit a communicating station state signal to the selected communicating station so as to cause the selected communicating station to enter into a sleep state;

causing a communicating station in the sleep state to receive a start command signal that causes the communicating station receiving the start command signal to cancel the sleep state; and preventing the selected communicating station from communicating in the sleep state until the start command signal is received by the selected communicating station.

2. The wireless communicating method as set forth in claim 1, wherein the communicating station state signal represents whether a communicating station is in the sleep state, and the communicating station state signal is transmitted from the control station to the communicating station with the control area of each frame.

3. The wireless communicating method as set forth in claim 1, wherein the start command signal is transmitted from the controlling station to the communicating station in the sleep state in the control area of each frame.

4. The wireless communicating method as set forth in claim 1, wherein a communicating station in the sleep state receives at least the start command signal.

5. The wireless communicating method as set forth in claim 1, wherein the communicating station state change request signal is a signal with which a communicating station requests the controlling station to set the communicating station to the sleep state, and the communicating station state change request signal is transmitted from the communicating station to the controlling station in the control area of each frame.

6. A wireless communicating system having a plurality of communicating stations and a controlling station for controlling an accessing operation of the plurality of communicating stations, a communication signal being transmitted and received between each of the plurality of communicating stations and the controlling station, the communication signal having a control area and a data area structured as a frame on a time division basis, the system comprising:

means for causing a communicating station to transmit a communicating station state change request signal to the controlling station;

means for causing the controlling station to transmit a communicating station state signal to the communicating station so as to cause the communicating station to enter into a sleep state, wherein a communicating station in the sleep state receives a start command signal so as to cause the communicating station to cancel the sleep state; and means for preventing the communicating station from communicating in the sleep state until the start command signal is received by the communicating station.

7. The wireless communicating system as set forth in claim 6, wherein the communicating station state signal represents whether a communicating station is in the sleep state, and the communicating station state signal is transmitted from the control station to the communicating station in the control area of each frame.

8. The wireless communicating system as set forth in claim 6, wherein the start command signal is transmitted from the controlling station to the communicating station in the sleep state in the control area of each frame.

9. The wireless communicating system as set forth in claim 6, wherein a communicating station in the sleep state receives at least the start command signal.

10. The wireless communicating system as set forth in claim 6, wherein the communicating station state change request signal is a signal with which a communicating station requests the controlling station to set the communicating station to the sleep state, and the communicating station state change request signal is transmitted from the communicating station to the controlling station in the control area of each frame.

11. A communicating station of a wireless communicating system having a plurality of communicating stations and a controlling station for controlling an accessing operation of the plurality of communicating stations, a communication signal being transmitted and received between each of the plurality of communicating stations and the controlling station, the communication signal having a control area and a data area structured as a frame on a time division basis, the communicating station comprising:

communicating station state change request signal transmitting means for transmitting a communicating station state change request signal with which a communicating station requests the controlling station to set the communicating station to a sleep state;

communicating station state signal receiving means for receiving a communicating station state signal that represents whether a communicating station is in the sleep state;

start command signal receiving means for receiving a start command signal that cause the communicating station to cancel the sleep state;

controlling means for transmitting the communicating station state change request signal that requests the controlling station to set the communicating station to the sleep state, receiving the communicating station state signal that causes the relevant communicating station to enter the sleep state, and receiving the start command signal that causes the communicating station to cancel the sleep state; and preventing means for preventing the communicating station from communicating in the sleep state until the start command signal is received by the communicating station.

12. The communicating station as set forth in claim 11, wherein the communicating station state signal represents whether a communicating station is in the sleep state, and said communicating station state signal transmitting means transmits the communicating station state signal with the control area of each frame.

13. The communicating station as set forth in claim 11, wherein the start command signal is transmitted to a communicating station in the sleep state so as to cause the communicating station to cancel the sleep state, and said start command signal receiving means receives the start command signal in the control area of each frame.

14. The communicating station as set forth in claim 11, wherein the start command signal is received even if the communicating station is in the sleep state.

15. The communicating station as set forth in claim 11, wherein the communicating station state change request signal is a signal with which a communicating station requests the controlling station to set the communicating station to the sleep state, and said communicating station state change request signal receiving means transmits the communicating station state change request signal in the control area of each frame.

16. A controlling station of a wireless communicating system having a plurality of communicating stations and a controlling station for controlling an accessing operation of the plurality of communicating stations, a communication signal being transmitted and received between the plurality of communicating stations and the controlling station, the communication signal having a control area and a data area structured as a frame on a time division basis, the controlling station comprising:

communicating station state signal transmitting means for transmitting a communicating station state signal that represents whether a communicating station is in a sleep state;

start command signal transmitting means for transmitting a start command signal that causes the communicating station in the sleep state to cancel the sleep state, wherein the communicating station does not communicate in the sleep state until the start command signal is received by the communicating station;

communicating station state change request signal receiving means for receiving a communication state change request signal with which a communicating station request the controlling station to set the communicating station to the sleep state; and controlling means for causing a communicating station to transmit the communicating station state signal so as to cause the communicating station to enter into the sleep state, the controlling station to transmit the communicating station state signal corresponding to the communicating station state change request signal, and the controlling station to transmit the start command signal to the communicating station so as to cause the communicating station to cancel the sleep state.

17. The controlling station as set forth in claim 16, wherein the start command signal is transmitted to a communicating station in the sleep state so as to cause the communicating station to cancel the sleep state, and said start command signal transmitting means transmits the start command signal to the communicating station in the control area of each frame.

18. The controlling station as set forth in claim 16, wherein the communicating station state change request signal is a signal with which a communicating station performs one of setting and canceling the sleep state of the communicating station, and said communicating station state change request signal receiving means receives the communicating station state change request signal from the communicating station in the control area of each frame.

19. The controlling station as set forth in claim 16, wherein the communicating station state signal represents whether a communicating station is in the sleep state, and said communicating station state signal transmitting means transmits the communicating station state signal in the control area of each frame.

* * * * *